(12) United States Patent
Leys et al.

(10) Patent No.: US 8,689,817 B2
(45) Date of Patent: Apr. 8, 2014

(54) WELDED DIAPHRAGM VALVE

(75) Inventors: John A. Leys, Chaska, MN (US); Mike Schleicher, Victoria, MN (US)

(73) Assignee: Entegris, Inc., Billerica, MA (US)

( * ) Notice: Subject to any disclaimer, the term of this patent is extended or adjusted under 35 U.S.C. 154(b) by 841 days.

(21) Appl. No.: 12/160,037

(22) PCT Filed: Jan. 4, 2007

(86) PCT No.: PCT/US2007/000067
§ 371 (c)(1),
(2), (4) Date: Dec. 4, 2008

(87) PCT Pub. No.: WO2007/081702
PCT Pub. Date: Jul. 19, 2007

(65) Prior Publication Data
US 2009/0242818 A1    Oct. 1, 2009

Related U.S. Application Data

(60) Provisional application No. 60/756,829, filed on Jan. 6, 2006.

(51) Int. Cl.
*F16K 51/00* (2006.01)
(52) U.S. Cl.
USPC ............... 137/315.05; 251/63.6; 251/331
(58) Field of Classification Search
USPC .............. 251/63.5, 331, 321, 332, 63.6; 137/15.19, 15.18, 315.05
See application file for complete search history.

(56) References Cited

U.S. PATENT DOCUMENTS

| | | | |
|---|---|---|---|
| 3,955,794 A | 5/1976 | Hankosky | |
| 4,199,850 A | 4/1980 | Velan | |
| 4,343,456 A * | 8/1982 | Zitzloff | 251/255 |
| 4,929,293 A | 5/1990 | Osgar | |
| 5,002,086 A * | 3/1991 | Linder et al. | 137/312 |
| 5,158,439 A * | 10/1992 | Fukumoto | 417/394 |
| 5,381,301 A * | 1/1995 | Hudis | 361/275.2 |
| 5,598,872 A * | 2/1997 | Kasugai et al. | 137/854 |
| 5,725,007 A | 3/1998 | Stubbs | |
| 5,857,661 A | 1/1999 | Amada et al. | |
| 6,244,566 B1 | 6/2001 | France et al. | |
| 6,575,187 B2 | 6/2003 | Leys et al. | |
| 6,612,538 B2 * | 9/2003 | Fukano et al. | 251/63.5 |
| 6,676,781 B2 * | 1/2004 | Kochte | 156/73.1 |
| 6,907,897 B2 * | 6/2005 | Maula et al. | 137/334 |
| 2001/0019116 A1 * | 9/2001 | Fukano et al. | 251/63.6 |
| 2002/0053651 A1 * | 5/2002 | Fukano et al. | 251/28 |
| 2005/0006617 A1 | 1/2005 | Leys | |

FOREIGN PATENT DOCUMENTS

| | | |
|---|---|---|
| JP | 2002-022055 | 1/2002 |
| JP | 2005-163877 | 6/2005 |
| TW | 496937 | 8/2002 |

* cited by examiner

*Primary Examiner* — John K Fristoe, Jr.
*Assistant Examiner* — Andrew J Rost
(74) *Attorney, Agent, or Firm* — Christensen Fonder P.A.

(57) ABSTRACT

A diaphragm valve including a valve body, a diaphragm assembly and an actuator assembly having a housing body that isolates the actuator from the ambient atmosphere. The diaphragm assembly is welded to the valve body to reduce and/or eliminate fluid leakage around the diaphragm assembly. Additionally or alternatively, the housing body for the actuator assembly may be welded to the valve body to reduce fluid leakage. The welding may be performed using ultrasonic welding techniques.

4 Claims, 4 Drawing Sheets

WELDED DIAPHRAGM VALVE

RELATED APPLICATIONS

The application claims the benefit of U.S. Provisional Application No. 60/756,829, hereby fully incorporated herein by reference.

FIELD OF THE INVENTION

The present invention generally relates to valves, and more specifically to diaphragm valves having welded components.

BACKGROUND OF THE INVENTION

Various types of valves are used in the semiconductor industry to transport fluids, including highly caustic fluids. It is important that these valves do not cause quiescent or dead spots in the fluid flow course, which could cause the fluid to become stagnant and degrade or could trap solids resulting in the contamination of the fluid. In addition, it is important that the number of potential leakage sources or seals be kept to a minimum due to the highly caustic fluids often used in the semiconductor industry.

These valves must be made of materials highly resistant to the caustic fluids. Contact with metal parts is generally to be avoided. The components that contact the fluids are typically formed of fluoropolymers such as perfluoroalkoxy (PFA), polyvinylidene (PVDF), or polytetrafluoroethylene (PTFE).

A drawback of previous valve designs is that fluid leaks sometimes occur between the interface of the diaphragm assembly and the valve body, or between the interface of body or housing components. Since the fluids used in the semiconductor industry tend to be highly caustic, fluid leakage can result in damage to the surrounding process line equipment and/or reduce the efficiency of the process, which can increase the cost of manufacturing semiconductors.

As such, there remains a need in the industry for valves that reduce and/or eliminate potential leakage of fluids used in the production of semiconductors.

SUMMARY OF THE INVENTION

A valve that addresses the need of the industry for reducing and/or eliminating potential leakage of fluids used in the production of semiconductors is provided according to the invention. In an embodiment, a valve includes a valve body, a diaphragm assembly and an actuator assembly having a housing body that isolates the actuator from the ambient atmosphere. In some embodiments, the diaphragm assembly is welded to the valve body to reduce and/or eliminate fluid leakage around the diaphragm assembly. Additionally or alternatively, the housing body for the actuator assembly may be welded to the valve body to reduce fluid leakage. In some embodiments, the valves can be formed using ultrasonic welding techniques.

Accordingly, an embodiment of the valve includes a valve body defining an inlet passage, an outlet passage, and a fluid chamber. The fluid chamber has an inner wall and an open side. The inlet passage and the outlet passage form an opening in the inner wall so that the inlet passage, the outlet passage and the fluid chamber are fluidly communicable with each other. A valve seat portion surrounds the inlet passage opening in the fluid chamber. A diaphragm assembly is positioned to sealingly close the open side of the fluid chamber and is welded in place in a continuous weld extending around the open side. The diaphragm has a valve portion facing into the fluid chamber, and is selectively positionable in at least a valve closed position wherein the valve portion is sealingly engaged with the valve seat portion to block fluid flow through the valve, and a valve open position wherein the valve portion is spaced apart from the valve seat to enable fluid flow through the valve.

In one aspect, a diaphragm valve includes a valve body defining an inlet passage, an outlet passage, and a fluid chamber with an inner wall and an open side. Each of the inlet passage and the outlet passage form an opening in the inner wall so that the inlet passage, the outlet passage and the fluid chamber are fluidly communicable with each other. The valve may further include a valve seat portion surrounding the inlet passage opening in the fluid chamber and a flexible diaphragm assembly with a valve portion facing into the fluid chamber. The flexible diaphragm assembly is selectively shiftable between at least a valve closed position wherein the valve portion is sealingly engaged with the valve seat portion to block fluid flow through the valve, and a valve open position wherein the valve portion is spaced apart from the valve seat to enable fluid flow through the valve. An actuator assembly may be operably coupled with the flexible diaphragm assembly for selectively positioning the flexible diaphragm assembly in each of the valve open and the valve closed positions. The diaphragm assembly is welded to the valve body in a continuous weld to prevent the leakage of fluids around the diaphragm assembly. In some embodiments, the diaphragm assembly is welded to the valve body by ultrasonic welding.

In another aspect, the invention may include a diaphragm valve made by a process including providing a valve body defining an inlet passage, an outlet passage, and a fluid chamber with an inner wall and an open side. Each of the inlet passage and the outlet passage form an opening in the inner wall so that the inlet passage, the outlet passage and the fluid chamber are fluidly communicable with each other. The valve body may further include a valve seat portion surrounding the inlet passage opening in the fluid chamber, forming a diaphragm assembly for sealingly closing the open side of the fluid chamber. The diaphragm assembly has a valve portion facing into the fluid chamber. The flexible diaphragm assembly is selectively positionable in at least a valve closed position wherein the valve portion is sealingly engaged with the valve seat portion to block fluid flow through the valve, and a valve open position wherein the valve portion is spaced apart from the valve seat to enable fluid flow through the valve. The process further includes ultrasonically welding the diaphragm assembly to the valve body to reduce fluid leakage around the diaphragm assembly.

DETAILED DESCRIPTION OF THE INVENTION

Figure 1:
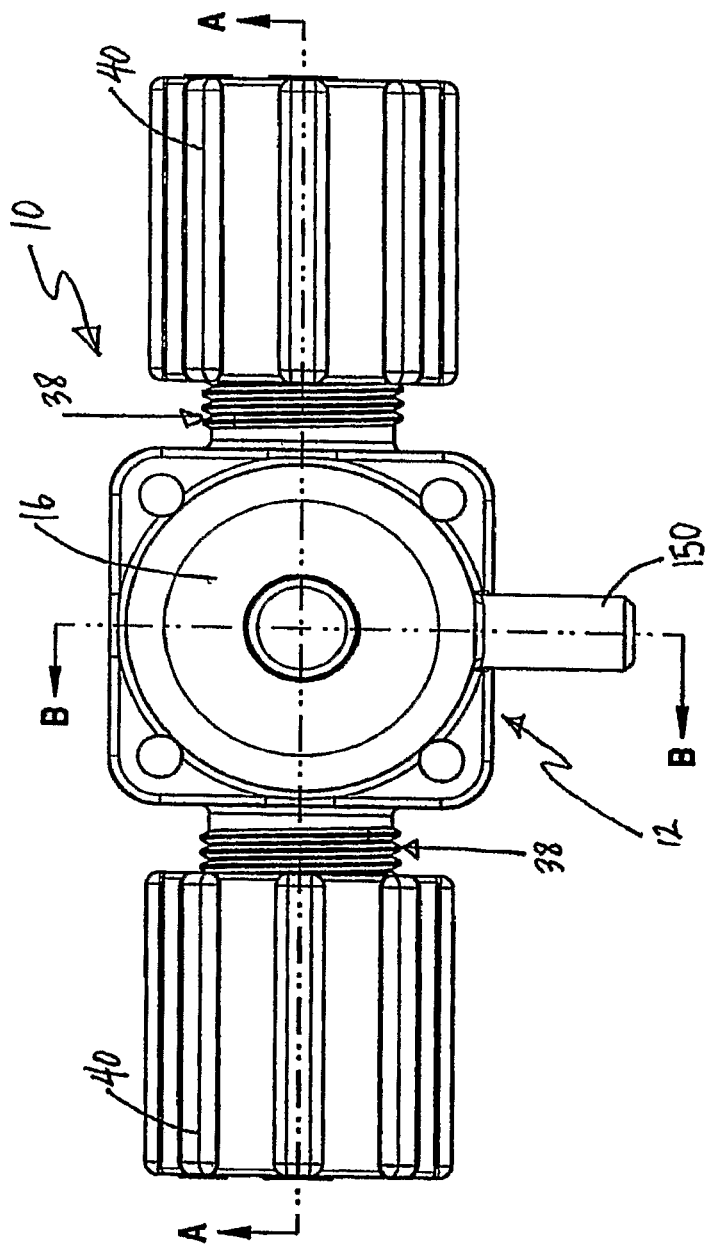
FIG. 1 is a top view of a diaphragm valve of the present invention.
Figure 2:
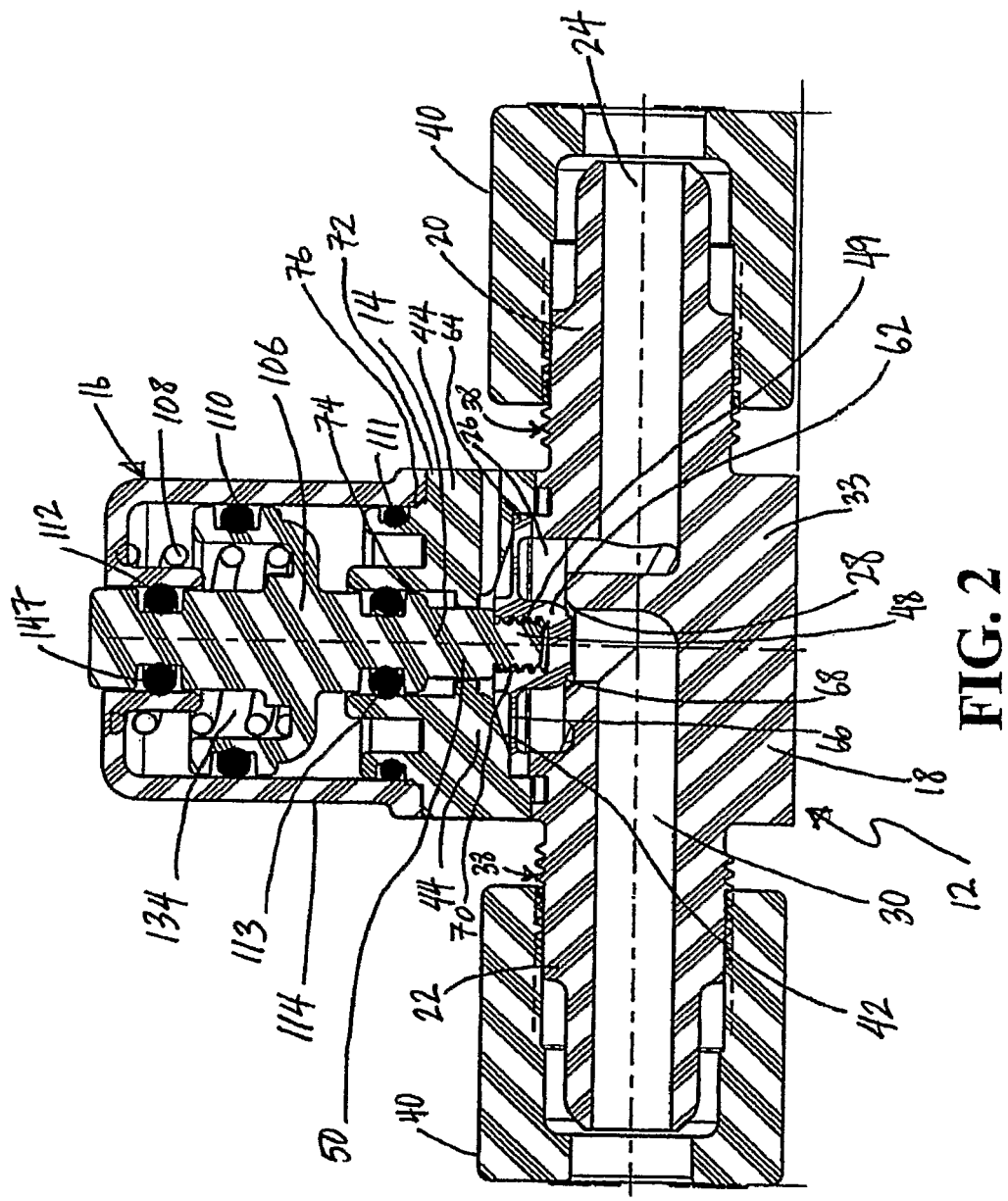
FIG. 2 is a cross-sectional view of the valve of FIG. 1 taken along line A-A of FIG. 1.

A valve 10 generally includes a body 12, a diaphragm assembly 14, and an actuator assembly 16. The body 12 has a central portion 18 with a pair of projecting nipples 20, 22. An inlet passage 24 extends from the nipple 20 into the central portion 18, turning upward and terminating in a fluid chamber 26. A valve seat 28 surrounds the termination of the inlet passage 24 in the fluid chamber 26. An outlet passage 30 extends from the fluid chamber 26 through the central portion 18 and the nipple 22. Each of the nipples 20, 22 has a threaded region 38 for receiving a threaded compression fitting sleeve 40 so that the valve 10 may be attached to piping or tubing (not depicted). Alternatively, of course, any other type of fitting or connection may be used to connect piping or tubing to the valve 10, including flare connections, straight threaded connections, or welding.

Diaphragm assembly 14 includes a primary diaphragm assembly 42 and a diaphragm retainer 44. In general, any diaphragm assembly that can regulate fluid flow through the valve body 12 can be employed in the valve 10. Suitable diaphragm assemblies are described in, for example, U.S. patent application Ser. No. 10/886,938 and in U.S. Pat. No. 6,575,187, entitled "Three-Way Plastic Valve," both of which are hereby incorporated by reference herein.

Primary diaphragm assembly 42 may be integrally formed in one piece and generally includes central valve member 62 and peripheral ring 64 coupled with diaphragm 66. Central valve member 62 defines valve face 68 for engaging valve seat 28 to seal off fluid flow when the valve is in the closed position. Central valve member 62 also defines upwardly facing threaded recess 70.

Diaphragm retainer 44 generally includes one-piece body portion 72 defining central bore 74 and outwardly facing shoulder 76. Shoulder 76 defines peripheral groove 78.

Figure 3A:
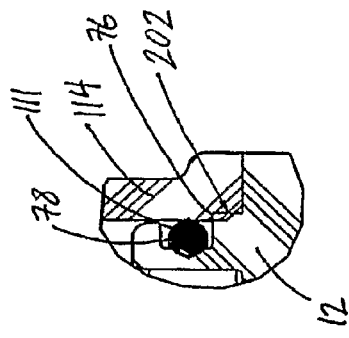
FIG. 3a is an enlarged fragmentary view of the region designated within inset 3a of FIG. 3.
Figure 3B:
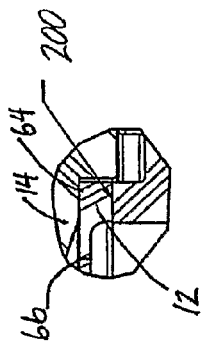
FIG. 3b is an enlarged fragmentary view of the region designated within inset 3b of FIG. 3.
Figure 3:
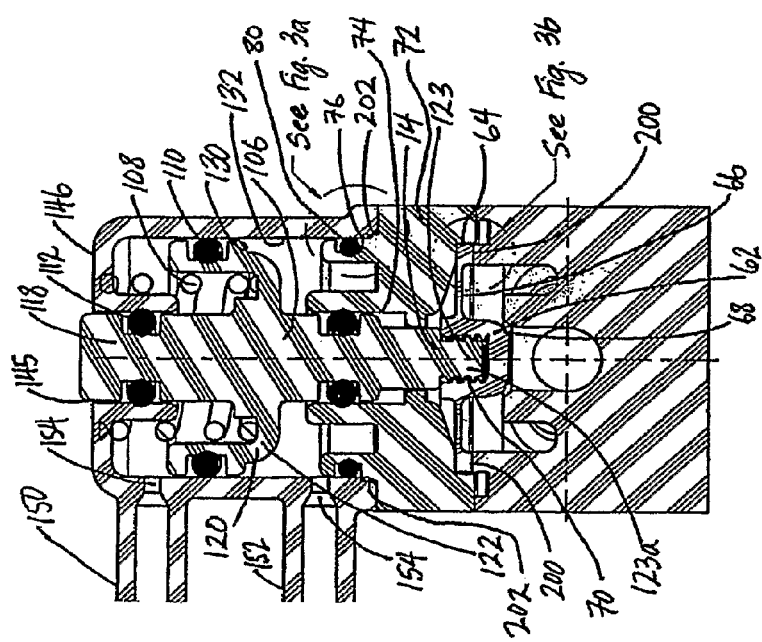
FIG. 3 is a cross-sectional view of the valve of FIG. 1 taken along line B-B of FIG. 1.
Figure 4:
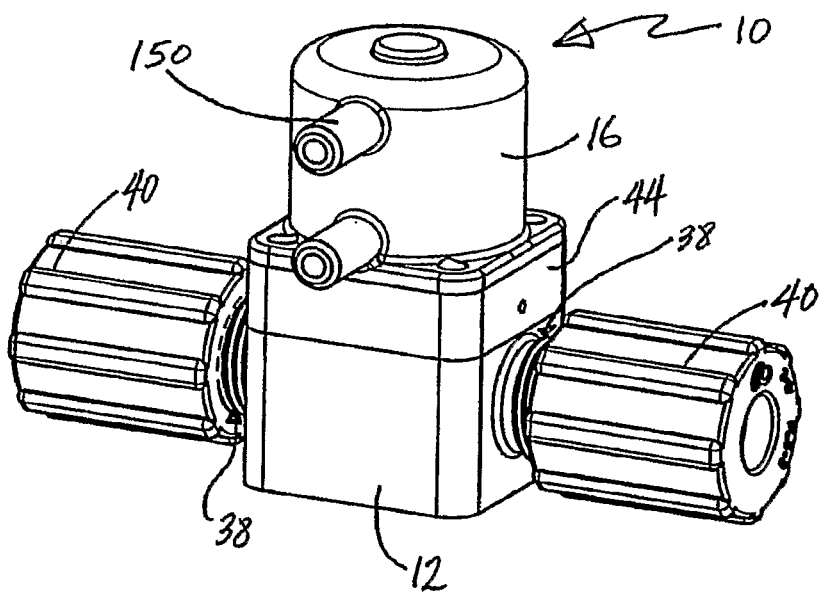
FIG. 4 is a perspective view of the valve of FIG. 1.

In some embodiments, as depicted in FIG. 3b, diaphragm assembly 14 is welded to valve body 12 to form a continuous sealing bond, or weld 200, which may reduce and/or eliminate fluid leakage around diaphragm assembly 14. Weld 200 preferably is continuous around the periphery of primary diaphragm assembly 42. In some embodiments, diaphragm assembly 14 and valve body 12 may be formed from PFA or a PFA composite, such that weld 200 bonds one PFA or PFA composite surface to a second PFA or PFA composite surface. Diaphragm assembly 14 may be welded to valve body 12 by any appropriate technique including, for example, ultrasonic welding, friction welding, vibration welding, heat welding, fusion welding, and combinations thereof. Bonding of polymers using infrared heat is described in U.S. Pat. No. 4,929,293, entitled "Welding Fluoropolymer Pipe and Fittings," which is hereby incorporated by reference herein.

As described above, in some embodiments, diaphragm assembly 14 may be welded to valve body 12 by ultrasonic welding. In general, ultrasonic welding involves using mechanical vibrations to form a joint or weld. In some ultrasonic welding processes, the components to be welded are held together between an oscillating horn and an immobile anvil, and subjected to vibrations at right angles to the contact area. By alternating high frequency stresses, heat can be generated at the joint interface to produce a suitable weld. Typically, the vibrations are of a high frequency such as, for example, from about 10 to about 70 kHz. In other embodiments, the frequency can be from about 20 to about 40 kHz. Ultrasonic welding of polymers is described in U.S. Pat. No. 5,381,301, entitled "Leak-Tight and Rupture Proof, Ultrasonically Welded, Polymer-Encased Electrical Capacitor With Pressure Sensitive Circuit Interrupter," and U.S. Pat. No. 6,676,781, entitled "Thermoplastic Structural Piece Containing Welded Portion," both of which are hereby incorporated by reference herein.

Actuator assembly 16 functions to selectively shift central valve member 62 to regulate fluid flow through valve 10. Actuator assembly 16 generally includes actuator housing 114, preferably made of a fluoropolymer such as, for example, PVDF, PFA, PTFE or combinations thereof. Actuator assembly 16 further generally includes piston 106, spring package 108, and sealing rings 110, 111, 112, 113. Piston 106 is slidably disposed in housing 114, and generally includes stem portion 118 and skirt 120, connected by web portion 122.

Stem portion 118 has threaded projection 123 extending from bottom end 123a. Projection 123 is received in threaded recess 70 to couple stem portion 118 to central valve member 62. Stem portion 118 is slidably received through central bore 74 of diaphragm retainer 44. Stem portion 118 further defines peripheral groove 123b for receiving sealing ring 113.

Skirt 120 defines peripheral groove 130 for receiving sealing ring 110, which forms a sliding seal with an inner wall 132 of housing 114. Piston 106 preferably defines cup shaped upwardly directed recess 134. Spring package 108 fits within recess 134, and bears against inner surface of recess 134 and inner wall 132 of housing 114 so as to apply a downward bias to piston 106 and diaphragm assembly 14.

Housing 114 defines aperture 145 in top wall 146. Stem portion 118 of piston 106 extends through and slides within aperture 145. Sealing ring 112 fits over stem portion 118 and is received in peripheral groove 147. Sealing ring 112 functions to prevent leakage through aperture 145 and around stem portion 118. A powered or manual actuator device (not depicted) may be engaged with stem portion 118 so as to enable selective movement of piston 106 within housing 114. In some embodiments, actuator housing 114 includes inlets 150 and 152. Generally, inlets 150 and 152 each include a body having a bore that can provide a flow pathway for gases into the interior region of the actuator housing 114 via openings in the side of actuator housing 114. Valves 154 can be provided in the openings in the actuator housing 114 to regulate the flow of gases into and out of the interior region of the actuator housing 114. In these embodiments, gas can be used to move the actuator assembly 16.

As shown in FIG. 3a, in some embodiments, actuator housing 114 can be welded to diaphragm retainer 44 to form a continuous sealing bond, or weld 202, which can reduce and/or eliminate fluid leakage out of the valve 10. Again, weld 202 is preferably continuous around the periphery of diaphragm retainer 44. In some embodiments, actuator housing 114 and valve body 12 can be formed from PVDF or PVDF composite, and thus the weld can bond one PVDF or PVDF composite surface to a second PVDF or PVDF composite surface. In some embodiments, weld 202 can be formed by ultrasonic welding. Other suitable welding techniques are disclosed above.

In operation, spring package 108 biases piston 106 and diaphragm assembly 14 downward in a valve closed position, so that valve member 62 is sealingly engaged with valve seat 28, thereby closing off fluid flow through valve 10. Piston 106 may then be selectively shifted upward against the bias of spring package 108 so as to move valve member 62 into a valve open position away from valve seat 28, thereby enabling fluid to flow through inlet passage 24, fluid chamber 26 and outlet passage 30. Thus, diaphragm assembly 14 and valve member 62 are selectively positionable in a valve open or a valve closed position.

The above embodiments are intended to be illustrative and not limiting. Additional embodiments are within the claims. Although the present invention has been described with reference to particular embodiments, workers skilled in the art will recognize that changes may be made in form in detail with departing from the spirit and scope of the invention.

What is claimed is:

1. A process of making a diaphragm valve comprising:
forming a valve body from fluoropolymer material, the valve body defining an inlet passage, an outlet passage, and a fluid chamber with an inner wall and an open side, the open side having a periphery and each of the inlet passage and the outlet passage forming an opening in the inner wall so that the inlet passage, the outlet passage and the fluid chamber are fluidly communicable with each other; the valve body further including a valve seat portion along a common axis and surrounding the inlet passage opening in the fluid chamber; forming a flexible diaphragm assembly from fluoropolymer material, the flexible diaphragm assembly having a valve member portion, a peripheral sealing portion and a flexible diaphragm portion coupling the valve member portion and the peripheral sealing portion; and heat welding the peripheral sealing portion of the flexible diaphragm assembly directly to a surface of the periphery of the open side that lies in a plane perpendicular to the common axis in a continuous sealing weld without added material and over the open side of the fluid chamber with the valve member portion facing into the fluid chamber to form a welded interface, such that the peripheral sealing portion lies in a plane perpendicular to the common axis, and wherein the flexible diaphragm assembly is selectively positionable in at least a valve closed position wherein the valve member portion is sealingly engaged with the valve seat portion to block fluid flow through the valve, and a valve open position wherein the valve member portion is spaced apart from the valve seat to enable fluid flow through the valve.

2. The process of claim 1, further comprising: providing an actuator assembly comprising an actuator housing; and permanently welding the actuator housing to the valve body or the diaphragm assembly.

3. The process of claim 1, wherein the entirety of the welded interface is perpendicular to the common axis.

4. The process of claim 1, wherein the heat welding comprises bonding of polymers using infrared heat.

* * * * *